US012032339B2

(12) United States Patent
Rossier

(10) Patent No.: US 12,032,339 B2
(45) Date of Patent: Jul. 9, 2024

(54) PROCESS FOR BLANKING APPLIQUES IN THE FIELD OF WATCHMAKING

(71) Applicant: Universo S.A., La Chaux-de-Fonds (CH)

(72) Inventor: Gérard Rossier, La Chaux-de-Fonds (CH)

(73) Assignee: Universo S.A., La Chaux-de-Fonds (CH)

( * ) Notice: Subject to any disclaimer, the term of this patent is extended or adjusted under 35 U.S.C. 154(b) by 0 days.

(21) Appl. No.: 18/181,699

(22) Filed: Mar. 10, 2023

(65) Prior Publication Data

US 2023/0367267 A1 Nov. 16, 2023

(30) Foreign Application Priority Data

May 16, 2022 (EP) .................................... 22173607

(51) Int. Cl.
*G04D 3/00* (2006.01)
*G04B 19/10* (2006.01)

(52) U.S. Cl.
CPC ......... *G04D 3/0048* (2013.01); *G04B 19/103* (2013.01); *G04D 3/0092* (2013.01)

(58) Field of Classification Search
CPC .. G04D 3/0048; G04D 3/0092; G04D 3/0046; G04B 19/103; G04B 19/042; G04B 19/10; G04B 47/042; B04D 3/0272
See application file for complete search history.

(56) References Cited

U.S. PATENT DOCUMENTS

| | | | |
|---|---|---|---|
| 6,404,704 | B1 | 6/2002 | Bossel et al. |
| 2019/0278230 | A1 | 9/2019 | Trotta et al. |

FOREIGN PATENT DOCUMENTS

| | | | | |
|---|---|---|---|---|
| CH | 708935 | A2 * | 6/2015 | ............. C22C 38/58 |
| CH | 711 256 | A2 | 12/2016 | |
| CH | 712488 | A2 * | 11/2017 | |
| JP | 04350592 | A | 12/1992 | |
| JP | 05251605 | A | 9/1993 | |

OTHER PUBLICATIONS

English translation of CH-712488-A2 (Year: 2017).*
English translation of CH-708935-A2 (Year: 2015).*
European Search Report for EP 22 17 3607 dated Oct. 7, 2022.

* cited by examiner

*Primary Examiner* — Jun S Yoo
(74) *Attorney, Agent, or Firm* — Sughrue Mion, PLLC

(57) ABSTRACT

A process for blanking an applique for a watch dial, comprises a step of blanking with a laser beam a first part of the outline of this applique, defining a pointed zone or/and a thin groove of at least a first hollow or/and the point or/and the drawn-out portion of at least a first projecting part, and a step of blanking by means of a stamp a second part of said outline which is complementary with the first part. This hybrid blanking technology makes it possible to obtain appliques having, at the end of the blanking process according to the invention, an outline which defines at least one hollow having a pointed zone or/and a thin groove or/and which defines at least one projecting part forming a point or/and a drawn-out portion with configurations and particular dimensions that cannot be obtained by blanking merely by stamping.

17 Claims, 3 Drawing Sheets

PROCESS FOR BLANKING APPLIQUES IN THE FIELD OF WATCHMAKING

CROSS REFERENCE TO RELATED APPLICATIONS

This application is claiming priority based on European Patent Application No. 22173607.7 filed on May 16, 2022.

TECHNICAL FIELD OF THE INVENTION

The invention relates to processes for manufacturing appliques in the field of watchmaking and in particular blanking such appliques. Appliques are generally arranged on the surface of watch dials, which are then each associated with an analogue time display, to provide relief to the time graduation or to the time data, for example Roman numerals from I to XII.

TECHNOLOGICAL BACKGROUND

A person skilled in the art generally uses the stamping technique to blank appliques. The blanking step generally takes place before certain applique finishing steps. A known advantage of stamping is the relatively low cost thereof for the production of appliques in large numbers. Indeed, once the stamp has been created, which can be relatively costly, the process for blanking appliques with the stamp is rapid and inexpensive. However, blanking by stamping has shape limitations for appliques, such that blanking by stamping is suitable for relatively simple shapes. In particular, the manufacture of the stamps and the stamping process do not make it possible to obtain very narrow, hollow or solid parts, or pointed zones without a rounded end outline, at the point, which has an average radius that cannot technically be less than a certain limit value, which is relatively great and particularly depends on the height of the side wall of the applique, during the blanking thereof, in the zone of the rounded outline.

The document CH 711 256 A2 describes a process for manufacturing horological components in a strip, in particularly a process for machining and blanking appliques having a triangular outline in a strip. After a step of machining appliques to provide some relief at the top surface, particularly facets, this document proposes to partially trim the appliques with a laser while retaining a strip arrangement. In fact, in concrete terms, it is provided to blank with a laser the entire outline of the appliques while only retaining one or a few attachment point(s) (very narrow bridge having a width between 0.01 and 0.02 mm) still connecting the blanked appliques to the strip to facilitate the transport of these appliques to the location wherein they are manually detached from the strip and arranged on the surface of dials. Laser machining has the advantage of being able to blank the appliques at a final stage of the manufacture thereof, which makes it possible to perform finishing steps before such a laser blanking and therefore on all the appliques still connected to the strip in question.

Although the document CH 711 256 A2 gave itself the aim of proposing a process for manufacturing high-quality horological components more rapidly while limiting manual operations, it turns out that in the case of appliques having a relatively long outline, particularly in the case of Arabic numerals or Roman numerals indicated as examples in this document, the laser blanking step is relatively time-consuming, which makes this step relatively costly and thus increases the manufacturing cost of such appliques.

Thus, the choice left to a person skilled in the art by the prior art between laser blanking of the appliques (while advantageously retaining at least one weak attachment point enabling easy final separation of the appliques from the strip bearing them) and blanking by stamping results in the need to choose, for the appliques, between a relatively high manufacturing cost and relatively simple shapes, particularly an outline of each applique without at least one hollow having a pointed zone with a very small end arc, having therefore a very small radius, or/and a thin groove and without a projecting part having a pointed zone, with a very small end arc or with no end rounding, or/and a drawn-out portion.

SUMMARY OF THE INVENTION

The objective of the present invention is that of proposing a process for blanking appliques in the field of watchmaking which does not have either the above-mentioned drawbacks of the stamping techniques, namely shape limitations for appliques, or the high cost associated with the laser blanking technique as proposed in the prior art.

To this end, the invention relates to a process for blanking an applique intended for a watch dial and having, at the end of the blanking process, an outline which defines at least one hollow having a pointed zone or/and a thin groove or/and which defines at least one projecting part forming a point or/and a drawn-out portion. According to the invention, the blanking process comprises, on one hand, a step of blanking with a laser beam a first part of the outline defining the pointed zone or/and the thin groove of at least a first hollow, from said at least one hollow, or/and the point or/and the drawn-out portion of at least a first projecting part, from said at least one projecting part, and, on the other, a step of blanking by means of a stamp, i.e. by stamping, a second part of the outline which is complementary with the first part.

"Pointed zone" denotes a zone of a hollow (therefore of a void) which ends in a point (while generally having a small end rounding). "Thin groove" denotes a zone of a hollow where the distance between two side walls which form the thin groove is relatively small, in particular substantially equal to or less than the mean height of these side walls on the zone in question. Similarly, "drawn-out portion" of a projecting part denotes a portion of this projecting part that is longer than it is wide, and the width of which is relatively small, in particular substantially equal to or less than the mean thickness of this portion.

According to a preferred alternative implementation, the junction points between the first part and the second part of the outline of the applique are each located at an apex of a part of the applique forming an external angle.

According to a main embodiment, the outline in said pointed zone of the first hollow ends with a first junction line connecting two line segments of this outline which converge, this first junction line having two end points, defining two end points of the two line segments. In a general variant, the two line segments are separated by a distance substantially equal to or less than a height, particularly the maximum height, of a side wall of the applique at the two end points.

According to an advantageous variant, the distance separating the two end points of the first junction line is less than two thirds of the above-mentioned height. In particular, the first junction line is a curved line defining a mean radius which is substantially equal to or less than one third of said height. According to a preferred variant, the distance separating the two end points of the first junction line is substantially equal to or less than half the above-mentioned height. In particular, the first junction line is a curved line defining a mean radius which is substantially equal to or less than a quarter of said height.

Thus, the hybrid blanking technology according to the invention makes it possible to obtain appliques having, at the end of the blanking process, an outline which defines at least one hollow having a pointed zone or/and a thin groove or/and which defines at least one projecting part forming a point or/and a drawn-out portion with configurations and particularly dimensions that cannot be obtained by blanking merely by stamping, while limiting the cost of blanking the appliques relative to the cost resulting from blanking entirely by means of a laser beam, optionally except for attachment points.

BRIEF DESCRIPTION OF THE FIGURES

The invention will be described in more detail hereinafter with reference to the accompanying drawings, given by way of examples that are in no way limiting, wherein.

DETAILED DESCRIPTION OF THE INVENTION

Figure 1:
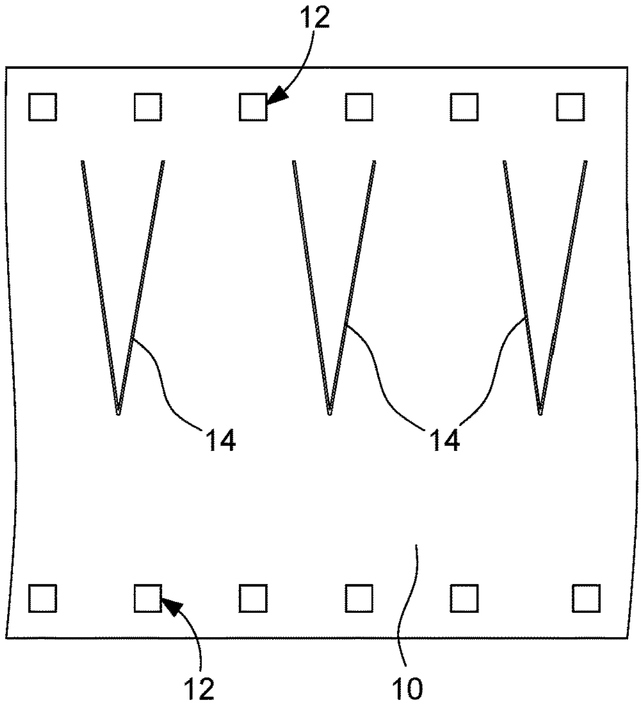
FIG. 1 shows a first step of a first variant of a first implementation of the process for blanking an applique according to the invention.
Figure 3:
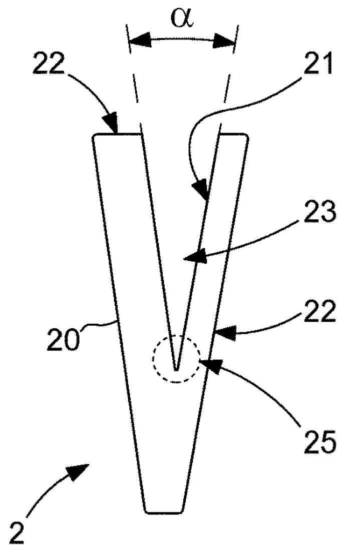
FIG. 3 shows an applique resulting from the blanking process according to the first variant mentioned above.

With reference to FIGS. 1 to 7, two variants of a first implementation of the process for blanking an applique according to the invention, intended for a watch dial, will be described.

As a general rule, within the scope of the first implementation of the blanking process according to the invention, the applique 2 and the applique 4 have, at the end of the blanking process, an outline 20, respectively 30 which defines at least one hollow 23, respectively 33*a*, 33*b* having a pointed zone 25, respectively 25A, 25B or/and a thin groove (variant not shown in the figures). The blanking process comprises, on one hand, a step of blanking with a laser beam a first part 21, respectively 31*a* and 31*b* of said outline defining at least said pointed zone or/and said thin groove of at least a first hollow 23, respectively 33*a*, from said at least one hollow, and, on the other, a step of blanking by means of a stamp, i.e. by stamping, a second part 22, respectively 32 of said outline which is complementary with the first part.

A first variant of the first implementation will be described in detail with reference to FIGS. 1 to 4. The applique 2 defines the Roman numeral V. The first part of the outline 20 of this applique consists of the single hollow 23 which is defined by the internal outline 21 of the applique. In particular, this internal outline is formed by two internal straight segments 21*a* & 21*b* of the outline 20 of the applique and a junction line 26 which connects these two internal straight segments in the pointed zone 25 of the hollow 23. Thus, the outline 20, in the pointed zone 25 of said hollow 23 ends with a junction line 26 connecting two line segments 21*a* & 21*b* which converge, this junction line 26 having two end points 24*a* & 24*b*, defining two end points of the two line segments. In a general variant, the two end points 24*a* & 24*b* are separated by a distance D substantially equal to or less than a height of a side wall of the applique 2 at these two end points. As a general rule, the distance D being very small, the height of the side wall is substantially identical at the two end points 24*a* & 24*b*. Otherwise, the maximum height would be considered for the upper limit of the distance D.

In the field of stamping, a general rule for producing appliques indicates a minimum ratio of '1' for the ratio between the width of a hollow or a projecting part and the height of the side wall of the appliques at the two points of the outline defining the width in question, whether for a thin groove or for a distance between two end points of two convergent line segments in a pointed zone of a hollow or for the width of a drawn-out portion, ending with a point or not, in the case of a protruding part. With certain stamp machining techniques, it is possible to reduce this ratio slightly, particularly with a limit less than or equal to 2/3. However, such stamps are more difficult to produce and are very fragile, particularly limiting the duration of use thereof. Furthermore, on approaching the lower limit for the above-mentioned ratio, the number of appliques to be removed after stamping due to malformation increases, which therefore reduces the industrial yield. The blanking process according to the invention effectively solves this technical problem as it limits the additional costs for blanking appliques, by proposing a hybrid technology with a first part of the outline of each applique blanked using a laser beam, this first part of the outline concerning above all the fragile parts or zones where the hollow or projecting part width provided is small, or very small. On the other hand, the second part of the outline, which does not have such fragile parts or zones, is blanked by stamping, i.e. by means of a stamp. Stamping has the advantage of a relatively short blanking time, since the whole outline blanked by the stamp is undertaken at the same time, while the laser blanking time is directly dependent on the length of the outline to be blanked.

The hybrid technology according to the invention makes it possible to combine the advantages of both known applique blanking techniques, namely stamping and laser blanking. Thanks to the process for blanking an applique according to the invention, it is particularly possible to obtain hollows having a pointed zone with an end rounding having a very small radius or projecting parts each forming a very sharp point, which is made possible thanks to the laser beam blanking. It will be sought to limit the length of the outline of the applique which is blanked with a laser, to reduce the cost of blanking. However, as seen from the variants described of the blanking process according to the invention, the first part of the outline blanked with a laser will preferably be selected such that the junction points between this first part and the second complementary part of the outline blanked by stamping correspond respectively to the apexes of external angles of the outline of the applique. This makes it possible to avoid problems of tolerances and particularly of imprecise junctions between two segments of the outline of the applique which would be blanked successively and respectively with a laser and by a stamp without having an external angle therebetween. Imprecise blanking at the junction points between the first part of the outline, blanked with a laser, and the second complementary part of this outline, blanked by stamping, would give rise to a decrease in the quality of the appliques produced or would require, to avoid such a phenomenon, a difficult and costly finishing step.

Figure 2:
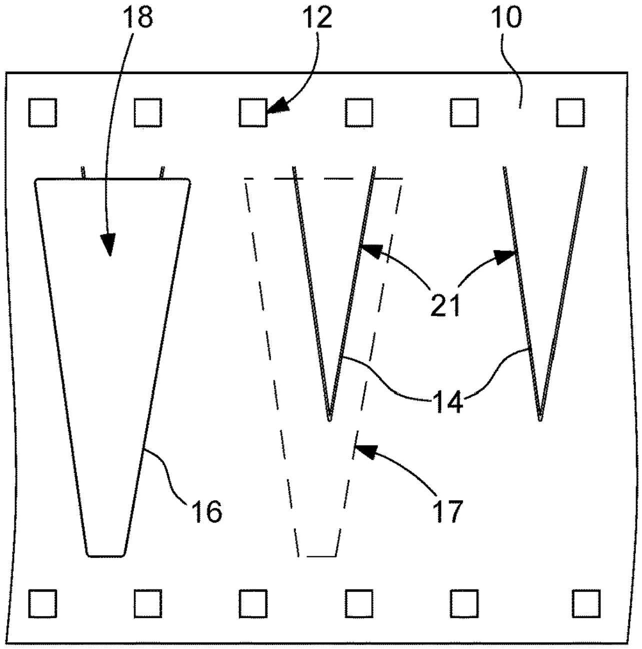
FIG. 2 represents a second step of the blanking process according to the first variant mentioned above.
Figure 4:
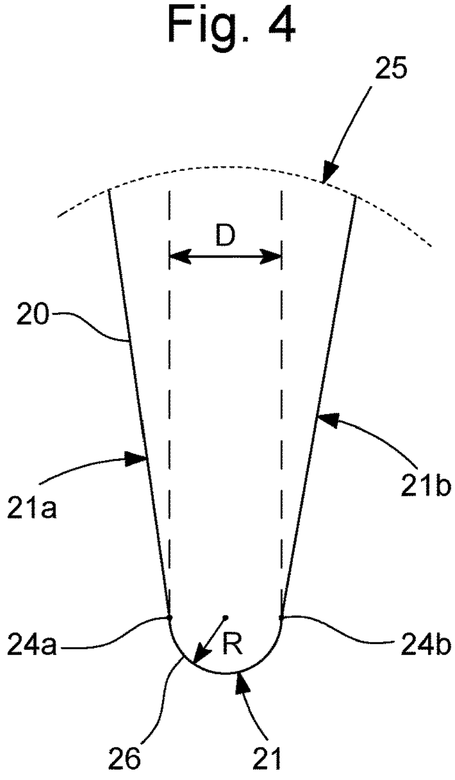
FIG. 4 is a partial enlargement of FIG. 3.

FIG. 1 shows a strip 10 having positioning perforations 12 and thin slots 14, in the shape of a V, obtained by blanking with a laser beam (laser blanking) followed by a first step of the blanking process wherein these thin slots are produced. These thin slots 14 externally define the internal outline 21 of the appliques 2 in production. FIG. 2 illustrates a second step of the blanking process wherein a trapezoidal shape, defined by the blanking line 16, is blanked by means of a relatively simple stamp, since the trapezoidal shape is a shape posing no particular difficulty for a stamp. Each applique 2 is blanked successively by an actuation of the stamp, by feeding the strip 10 by precise steps such that the outline 17 of the male part of the stamp and out of principle the female part thereof are positioned correctly with respect to the corresponding slot 15 previously machined with a laser to obtain the external outline 22 as sought for each applique 2 manufactured. After blanking the applique by stamping, on one hand, an opening 18 in the strip 10 and, on the other, an applique 2, represented in FIG. 3, and a triangular piece of waste remain.

According to a specific feature of the applique 2 obtained by the first implementation of the blanking process according to the invention, the two internal straight segments 21*a* & 21*b* have an angular offset a, i.e. an angular opening, the value of which is substantially equal to or less than 20°, and in a specific variant less than 15°.

In an advantageous variant, the distance D separating the two end points 24*a* & 24*b* of the junction line 26 is less than two-thirds of the height of a side wall of the applique 2 at these two end points. In a specific variant, the junction line 26 is a curved line defining a mean radius which is substantially equal to or less than a third of said height, particularly less than 0.06 mm. In a specific variant, the curved line is an arc having a given radius.

In a preferred variant, the distance D separating the two end points 24*a* & 24*b* of the junction line 26 is substantially equal to or less than half the height of a side wall of the applique 2 at these two end points. In a specific variant, the junction line 26 is a curved line defining a mean radius which is substantially equal to or less than a quarter of said height, particularly less than 0.04 mm. In a specific variant, the curved line is an arc having a constant radius, particularly less than 0.04 mm. By way of example, the height of the side wall of the applique, following the blanking of the outline 20 thereof, is between 0.25 and 0.35 mm while the radius of the arc, forming the junction line 26, is between 0.025 and 0.035 mm. Therefore, there is a ratio of 1/10 between the radius of the junction line 26 and the height of the side wall of the applique in the pointed zone 25 of the hollow 23, in particular at the two end points 24*a* & 24*b* of this junction line. This is made possible by laser blanking technology in a metal strip 10 having the provided thickness for the appliques after the blanking thereof, a thickness which is generally then reduced slightly by finishing steps, particularly by producing a polished top surface or brilliant top facets obtained by a tool provided with a diamond.

Figure 6:
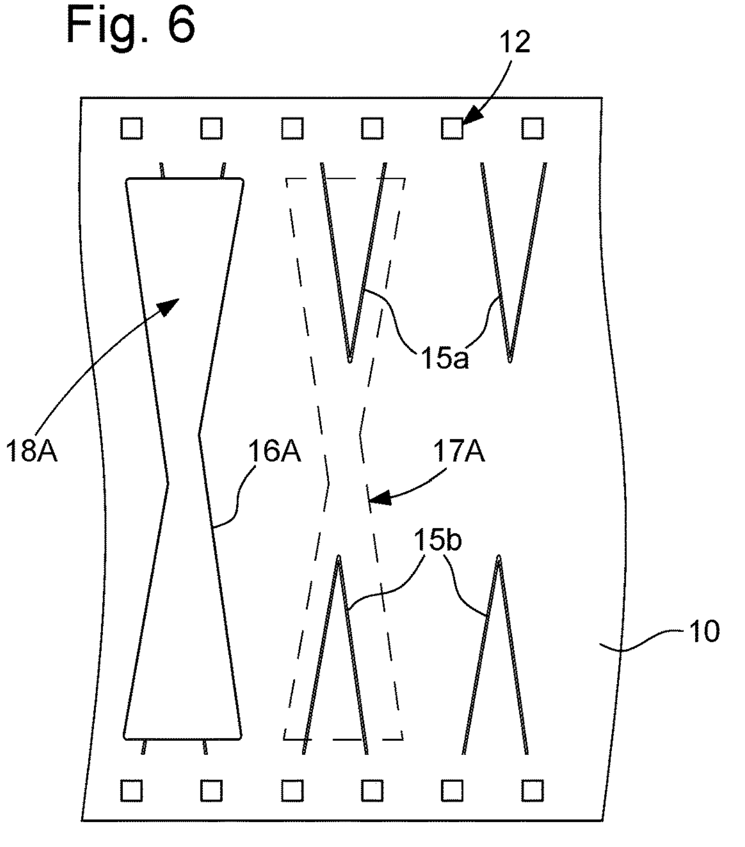
FIG. 6 represents a second step of the blanking process according to the second variant mentioned above.
Figure 7:
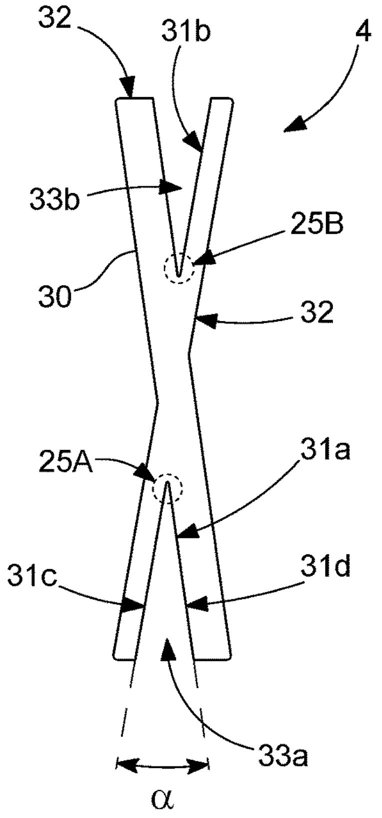
FIG. 7 shows an applique resulting from the blanking process according to the second variant mentioned above.

A second variant of the first implementation will be described hereinafter with reference to FIGS. 5 to 7. In this second variant, the applique 4 defines the Roman numeral X. The first part of the outline 30 of this applique consists of two hollows, i.e. a lower hollow 33*a* and an upper hollow 33*b* which are each defined by an internal outline 31*a*, respectively 31*b* of the applique 4. In particular, as in the case of the first variant concerned the V-shaped applique, the internal outline 31*a* of the lower hollow 33*a* is formed by two straight segments 31*c* & 31*d* and a junction line, similar to the junction line 26 represented in FIG. 4, which connects these two straight segments in the pointed zone 25A of the hollow 33*a*. The same applies for the upper hollow 33*b* which is similar to the lower hollow 33*a*. Thus, the disclosure linked with the first variant also applies for the second variant linked with the X-shaped applique, in respect of the lower hollow 33*a* and also the upper hollow 33*b*.

More specifically, the applique 4 defines four hollows, the first part of the outline 30 of this applique consisting of the two hollows having a pointed zone defining an acute angle, i.e. the lower hollow 33*a*, which defines a first hollow, and the upper hollow 33*b* which defines a second hollow also having a pointed zone. As for the first hollow, the outline in the pointed zone 25B of the second hollow 33*b* ends with a second junction line connecting two straight segments of this outline which converge and define the second hollow. This second junction line has two end points which are separated by a distance substantially equal to or less than a height of a side wall of the applique at the two end points of the second junction line. The second part 32 of the outline 30 is formed by the complementary part with the first part. This second part of the outline consists of the segments of the outline 30 defining the two lateral hollows, which each have at the bottom thereof an obtuse angle, and by the four lines of this outline defined by the ends of the four arms of the X-shaped applique.

Figure 5:
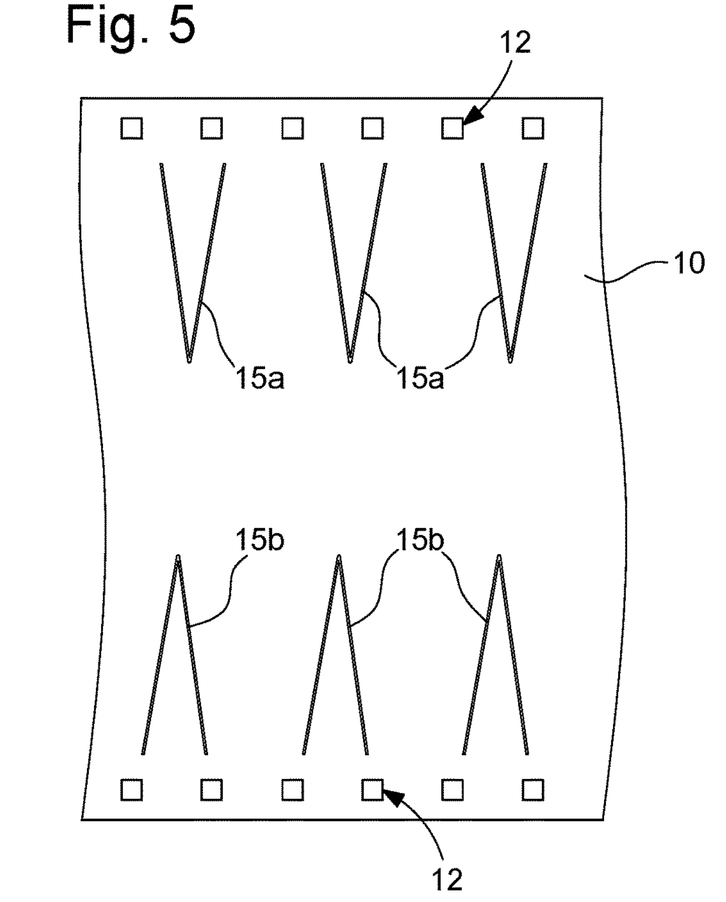
FIG. 5 shows a first step of a second variant of a first implementation of the process for blanking an applique according to the invention.

FIG. 5 shows a strip 10 having positioning perforations 12 and thin slots 15*a* and 15*b*, each in the shape of a V, obtained by laser blanking followed by a first step of the blanking process wherein these thin slots are produced. These thin slots 15*a* and 15*b* respectively define the internal outlines 31*a* and 31*b* of the appliques 4 in production. FIG. 6 illustrates a second blanking step wherein an external casing, defined by the blanking line 16A, is blanked by means of a stamp having such a shape. Each applique 4 is blanked successively by an actuation of the stamp, by feeding the strip 10 by precise steps such that the outline 17A of the male part of the stamp and the female part thereof are positioned correctly with respect to the two corresponding slots 15*a* & 15*b* previously machined with a laser to obtain the external outline 32 as sought for each applique 4 manufactured. After blanking the applique 4 by stamping, on one hand, an opening 18A in the strip 10 and, on the other, an applique 4, represented in FIG. 7, two triangular parts, which are production waste, remain.

According to a specific feature of the applique 4 obtained by the first implementation of the blanking process according to the invention, the two internal straight segments 31*c* & 31*d* have an angular offset a, the value of which is less than 30°, and in a specific variant substantially equal to or less than 20°.

As disclosed above, in an advantageous variant, the distance separating the two end points of the second junction line is less than two thirds of the height of a side wall of the applique at these two end points. According to a specific feature, the second junction line is a curved line which defines a mean radius which is substantially equal to or less than a third of the height of the side wall of the applique at the two end points of the second junction line. In particular, the mean radius of the second junction line is less than 0.06 mm.

In a preferred variant, the distance separating the two end points of the second junction line is substantially equal to or less than half the height of a side wall of the applique at these two end points. In particular, the second junction line is a curved line defining a mean radius which is substantially equal to or less than a quarter of the height of the side wall of the applique at the two end points of the second junction line. In a specific variant, the second junction line is an arc in which the radius is equal to or less than 0.04 mm.

A second implementation of the process for blanking an applique according to the invention will be described further hereafter. The applique has, at the end of the blanking process according to this second implementation, an outline which defines at least one projecting part forming a point or/and a drawn-out portion. As a general rule, the blanking process comprises a step of blanking with a laser beam a first part of said outline defining said point or/and said drawn-out portion of at least a first projecting part, from said at least one projecting part, and a step of blanking by means of a stamp a second part of said outline which is complementary with the first part.

Figure 8:
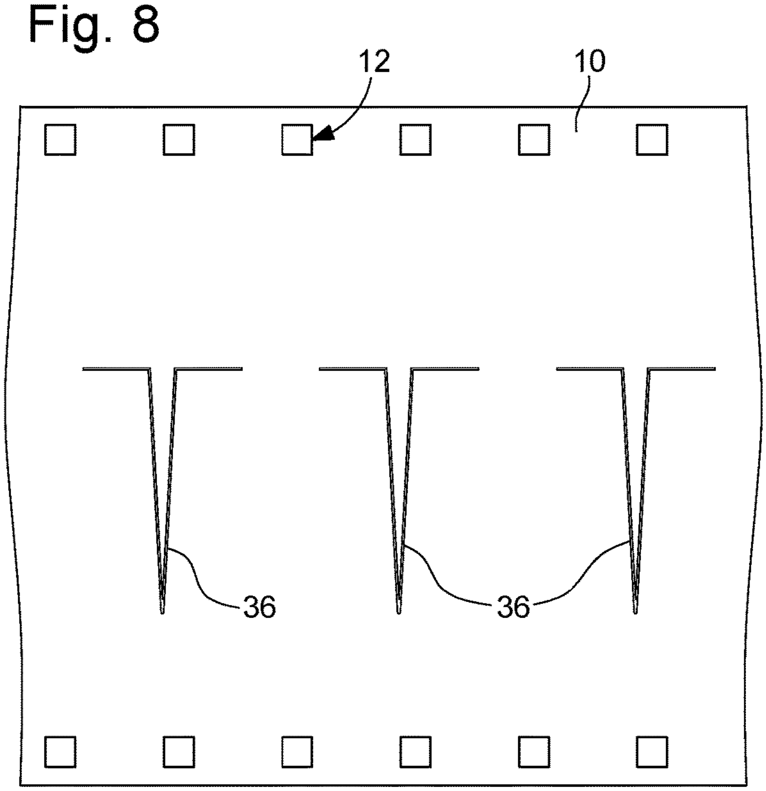
FIG. 8 shows a first step of a second implementation of the process for blanking an applique according to the invention.
Figure 10:
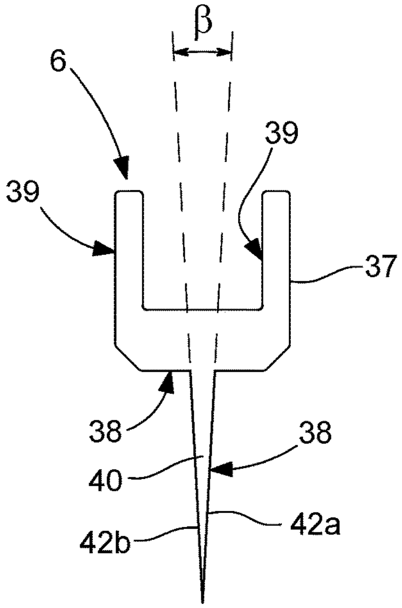
FIG. 10 shows an applique resulting from the blanking process according to the second implementation.
Figure 9:
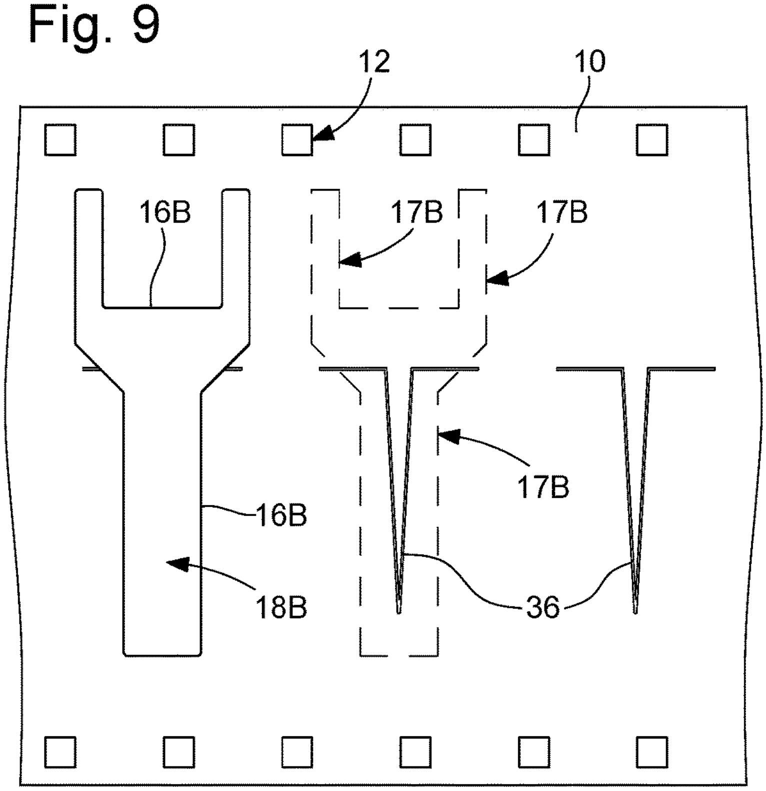
FIG. 9 represents a second step of the blanking process according to the second implementation.

In the variant represented in FIGS. 8 to 10, the applique 6 has, at the end of the blanking process, an outline 37 which defines at least one projecting part 40 forming a point. The first part 38 of the outline 37, blanked with a laser, comprises two straight segments 42*a* & 42*b* defining the point 40 and two other straight segments located respectively on both sides of the base of the point and forming respectively with the two straight segments 42*a* & 42*b* two internal angles. The two straight segments 42*a* & 42*b* of the outline of the point have an angular offset/an angular opening β. In a specific variant, the value of the angle β is substantially equal to or less than 20°, and in a specific variant less than 15°.

The second part 39 of the outline 37 is complementary with the first part 38, i.e. the first and second parts 38 & 39 form the entire outline 37 of the applique 6 together.

FIG. 8 shows a strip 10 having positioning perforations 12 and thin slots 36 obtained by blanking with a laser beam (laser blanking) followed by a first step of the blanking process wherein these thin slots are produced. These thin slots 36 define the first part 38 of the outline 37 of the appliques 6 in production. FIG. 9 illustrates a second step of the blanking process wherein a shape, defined by the blanking line 16B, corresponds on top to that defined by the second part 39 of the outline 37 of each applique 6. The blanking line 16B forms at the bottom a relatively wide arm, the positioning whereof is such that this arm is superposed on the point 40 obtained by laser blanking and covers this point entirely. The piece defined by the blanking line 16B is blanked by means of a relatively simple stamp, since the shape thereof is relatively simple and poses no particularly difficulty for a stamp. As in the first implementation described in FIGS. 2 and 6, the two ends of the thin slot 36 machined with a laser go slightly beyond the first part 38 of the outline 37 provided for the applique 6, the additional portions of the thin slot 36 at the two ends thereof relative to the first part 38 of the outline 37 are provided outside the applique in production and therefore remain in the strip 10 once the applique has been blanked entirely. It is particularly for this reason that the two straight segments which extend transversely to the longitudinal direction of the point of the two sides of the bases thereof are blanked with a laser like the two straight segments of the point 40 with which they form two internal angles.

As in the first implementation of the blanking process, each applique 6 is blanked successively by an actuation of the stamp, by feeding the strip 10 by precise steps such that the outline 17B of the male part of the stamp and the female part thereof are positioned correctly with respect to the corresponding slot 36 previously machined with a laser to obtain the external outline 32 as sought for each applique 6 manufactured. After blanking the applique by stamping, on one hand, an opening 18B in the strip 10 and, on the other, an applique 6, represented in FIG. 10, and a U-shaped piece of waste remain.

The invention claimed is:

1. A process for blanking an applique for a watch dial, this applique having, at the end of the blanking process, an outline which defines at least one hollow, having at least one of a pointed zone and a thin groove, or which defines at least one projecting part forming at least one of a point and a drawn-out portion;

wherein the blanking method comprises:

blanking with a laser beam a first part of said at least one of a pointed zone and a thin groove of a first hollow from said at least one hollow, or said at least one of a point and a drawn-out portion of at least a first projection part from said at least one projecting part; and blanking with a stamp a second part of said outline which is complementary with the first part.

2. The blanking process according to claim 1, wherein said outline in said pointed zone of said first hollow ends with a first junction line connecting two line segments of this outline which converge, this first junction line having two end points, defining two end points of the two line segments, which are separated by a distance (D) substantially equal to or less than a height of a side wall of the applique at the two end points.

3. The blanking process according to claim 2, wherein said distance separating the two end points of the first junction line is less than two thirds of said height.

4. The blanking process according to claim 3, wherein said first junction line is a curved line defining a mean radius (R) which is less than a third of said height.

5. The blanking process according to claim 4, wherein said mean radius is less than 0.06 mm.

6. The blanking process according to claim 2, wherein said distance separating the two end points of the first junction line is less than half said height.

7. The blanking process according to claim 6, wherein the first junction line is a curved line defining a mean radius which is substantially equal to or less than a quarter of said height.

8. The blanking process according to claim 7, wherein said mean radius is equal to or less than 0.04 mm.

9. The blanking process according to claim 1, wherein the junction points between the first part and the second part of the outline of the applique are all located at an apex of a part of the applique forming an external angle.

10. The blanking process according to claim 9, wherein the applique defines the Roman numeral V, said first part of the outline of this applique consisting of the first hollow which is defined by the internal outline of the applique formed by two internal straight segments of the outline of the applique and the first junction line which connects these two internal straight segments.

11. The blanking process according to claim 10, wherein the two internal straight segments have an angular offset, the value of which is less than 20°.

12. The blanking process according to claim 9, wherein the applique defines the Roman numeral X, the outline of this applique thus defining four hollows, said first part of the outline of the applique consisting of a lower hollow, which defines said first hollow, and of an upper hollow which defines a second hollow from said at least one hollow, the outline in the pointed zone of the second hollow ending with a second junction line connecting two straight segments of this outline which converge and define the second hollow, this second junction line having two end points which are separated by a distance substantially equal to or less than a height of aside wall of the applique at the two end points of the second junction line.

13. The blanking process according to claim 12, wherein the two internal straight segments defining the second hollow have an angular offset, the value of which is less than 30°.

14. The blanking process according to claim 12, wherein said distance separating the two end points of the second junction line is less than two thirds of said height of the side wall of the applique at these two end points.

15. The blanking process according to claim 14, wherein the second junction line is a curved line defining a mean radius which is less than a third of the height of the side wall of the applique at the two end points of the second junction line.

16. The blanking process according to claim 12, wherein the distance separating the two end points of the second junction line is substantially equal to or less than half the height of a side wall of the applique at these two end points.

17. The blanking process according to claim 16, wherein the second junction line is a curved line defining a mean radius which is substantially equal to or less than a quarter of the height of the side wall of the applique at the two end points of the second junction line.

* * * * *